United States Patent [19]

Gancy et al.

[11] 4,219,396
[45] Aug. 26, 1980

[54] ELECTRODIALYTIC PROCESS

[75] Inventors: Alan B. Gancy, Syracuse; Theodore J. Jenczewski, Sherrill, both of N.Y.

[73] Assignee: Allied Chemical Corporation, Morris Township, Morris County, N.J.

[21] Appl. No.: 63,229

[22] Filed: Aug. 3, 1979

[51] Int. Cl.$^2$ .................................... B01D 13/02
[52] U.S. Cl. ............................. 204/180 P; 204/301
[58] Field of Search ........................ 204/180 P, 301

[56] References Cited

U.S. PATENT DOCUMENTS

| | | | |
|---|---|---|---|
| 3,562,139 | 2/1971 | Leitz | 204/296 |
| 3,868,314 | 2/1975 | Mizutani et al. | 204/296 |
| 4,024,043 | 5/1977 | Dege et al. | 204/180 P X |
| 4,049,519 | 9/1977 | Sloan | 204/180 P |

Primary Examiner—Arthur C. Prescott
Attorney, Agent, or Firm—Thomas D. Hoffman; Anthony J. Stewart

[57] ABSTRACT

An improved process for the electrodialysis of aqueous NaCl which operates at high current efficiency and low unit cell voltage drop to produce high strength, high purity $Na_2CO_3$ and either high purity HCl or $CaCl_2$ by utilizing cation permselective, anion permselective and bipolar membranes wherein the solutions on both sides of the anion permselective membrane are acidic.

11 Claims, 1 Drawing Figure

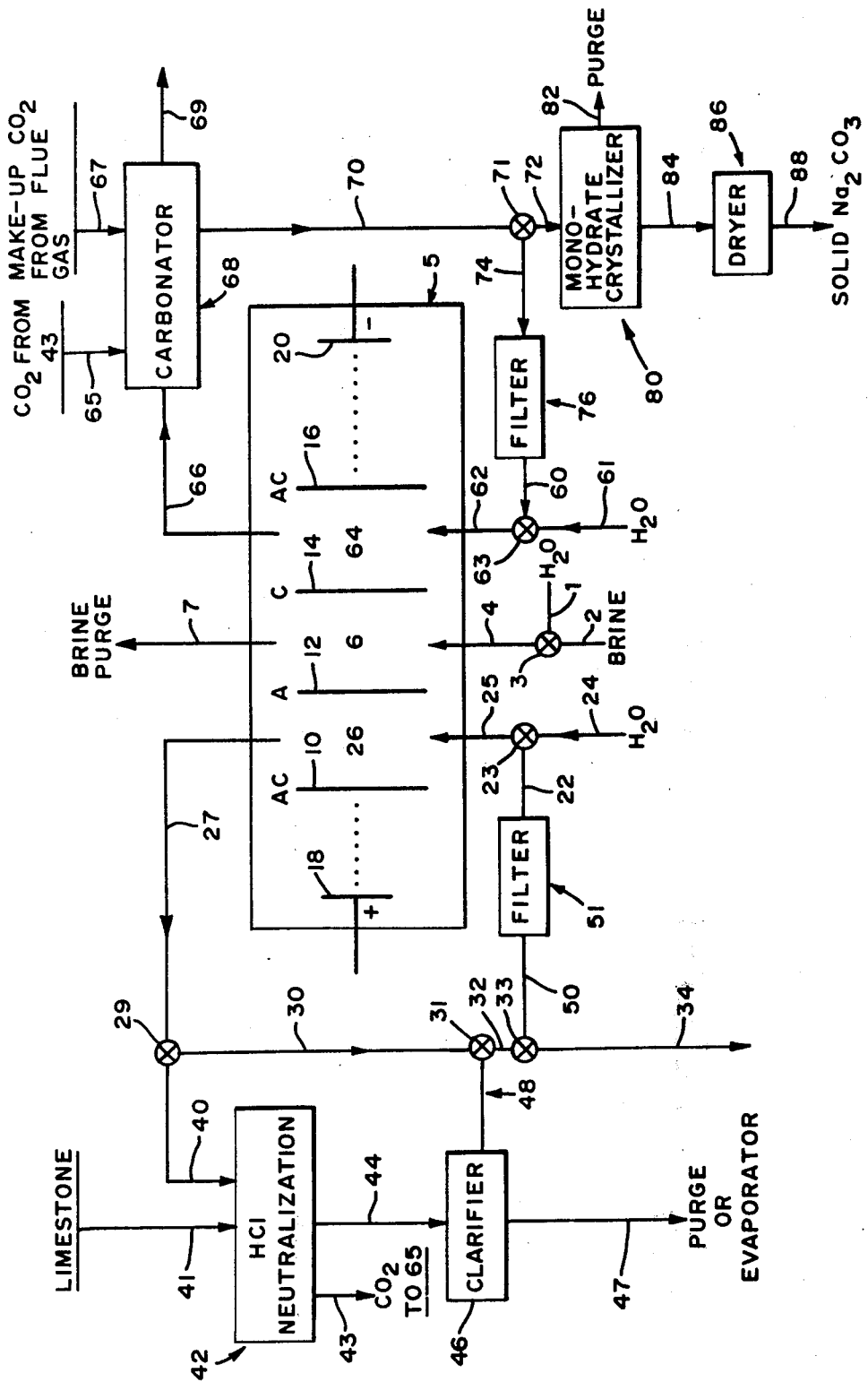

ELECTRODIALYTIC PROCESS

DESCRIPTION

This invention relates to an improved process for the electrodialysis of aqueous NaCl to produce high strength, high purity $Na_2CO_3$ and either high purity HCl or $CaCl_2$. More specifically, this invention relates to an electrodialysis process which utilizes a unit cell having anion permselective, cation permselective and bipolar membranes wherein the solutions on both sides of the anion permselective membranes are acidic and which operates at high current efficiency and low unit cell potential drop.

Sodium carbonate and calcium chloride are products of the well known Solvay ammonia-soda process. Although the raw materials are only aqueous NaCl and limestone, the process requires calcination of the limestone to produce CaO and $CO_2$ and the saturation of the aqueous NaCl with a gaseous mixture of $NH_3$ and $CO_2$. In addition, the calcium chloride produced by this process, contains large amounts of NaCl which can only be removed by additional purification steps.

British Pat. No. 1,474,446 discloses a method for the manufacture of chlorine gas and sodium carbonate by the combination of (a) the electrolysis of an aqueous sodium chloride solution in a diaphram cell and (b) the carbonation of the caustic brine leaving the cell. Disclosure of similar electrolytic processes are found in U.S. Pat. Nos. 3,220,941 (Osborne), 3,496,077 (Cooper) and 4,011,147 (Fujiwara et al). These prior art electrolytic processes produce sodium carbonate contaminated with a substantial quantity of NaCl from the feed brine. In addition, significant amounts of toxic, explosive gases, i.e., hydrogen and chlorine are produced at the electrodes.

Electrodialysis of aqueous sodium chloride solutions in a cell having a bipolar membrane is well known in the prior art. For example, U.S. Pat. No. 2,829,095 (Oda et al.) describes such an electrodialytic process but nowhere discloses how to operate the process to minimize power consumption while simultaneously producing high strength, high purity products. U.S. Pat. No. 3,383,080 (deKodrosy et al.); and U.S. Pat. No. 3,963,592 (Lindstrom) disclose electrodialytic processes which can operate only at low salt concentration and produce only dilute acidic and alkaline product streams due to the back migration of $H^+$ and $OH^-$ ions into the salt feed which occurs at high ion concentration. Thus, large amounts of energy must be consumed to concentrate these electrodialytic product streams to obtain commercially acceptable concentrated solutions.

U.S. Pat. No. 3,787,304 (Chlanda et al.) discloses an electrodialytic process wherein aqueous fluoride solutions are converted to aqueous HF and hydroxide base and the hydrofluoric acid is concentrated via monopolarpermselective membrane electrodialysis to produce concentrated solutions of HF.

SUMMARY OF THE INVENTION

Accordingly, it is one of the objects of this invention to provide an electrodialytic process which produces $Na_2CO_3$ and $CaCl_2$ from aqueous NaCl and limestone without employing ammonia.

Another object of this invention is to provide an electrodialytic process wherein high strength, high purity $Na_2CO_3$ and either high purity HCl or $CaCl_2$ are produced thereby minimizing purification and evaporation costs.

A further object of this invention is to provide an electrodialytic process which produces these high purity, high strength products while operating at high current efficiency and low unit cell potential drop and thereby minimizing power consumption.

Still another object of this invention is to provide an electrodialytic process which produces high strength $CaCl_2$ having a lower NaCl content than prior art processes.

Additional objects and advantages will become apparent from the disclosure which follows.

In accordance with the instant invention, there is provided a process for the electrodialysis of aqueous NaCl in an electrodialytic cell having anode and cathode compartments separated by acid, salt and base zones respectively which comprises the steps of:

(a) feeding an aqueous HCl stream to said acid zone of said electrodialytic cell located between the cation face of a bipolar membrane and one side of a weakly basic anion permselective membrane;

(b) feeding an aqueous NaCl stream to said salt zone located between the other face of said anion membrane and one face of a strongly acidic cation permeselective membrane;

(c) feeding an aqueous $Na_2CO_3$ stream to said base zone located between the other face of said cation membrane and the anion face of a bipolar membrane;

(d) passing a direct electric current through said electrodialytic cell, thereby effecting an increase in $H^+$ concentration in said HCl stream, an increase in $OH^-$ concentration in said $Na_2CO_3$ stream, the transfer of $Cl^-$ from said NaCl stream to the acid-enriched HCl stream and the transfer of $Na^+$ from said NaCl stream to the $OH^-$-enriched $Na_2CO_3$ stream;

(e) maintaining a pH of streams on both faces of said anion permselective membrane at a value less than about 7;

(f) withdrawing a portion of the partially depleted NaCl stream from said salt zone;

(g) withdrawing the HCl-enriched stream from said acid zone;

(h) withdrawing NaOH-enriched $Na_2CO_3$ stream from said base zone;

(i) contacting said NaOH-enriched $Na_2CO_3$ stream from step (h) with a carbonating agent thereby forming additional $Na_2CO_3$; and (j) withdrawing at least a portion of said $Na_2CO_3$ stream as product.

In a preferred embodiment of the instant invention, at least a portion of the high strength, high purity $Na_2CO_3$ product stream is diluted with water and recycled to the base zone to produce an enriched-NaOH stream; by contacting this enriched solution with a carbonating agent, e.g., $CO_2$ gas, a nearly saturated solution of high purity $Na_2CO_3$ is obtained. In another specific embodiment of this invention, at least a portion of the HCl product stream is contacted with limestone to produce $CaCl_2$ having a lower NaCl content than previously thought possible. Another advantageous feature of this invention is the recycling of the $CaCl_2$ to the acid compartment to produce a high strength, high purity product solution and thereby minimize evaporation and purification costs. When the process of this invention operates to produce and recycle $Na_2CO_3$ and $CaCl_2$, both products are obtained at high strength and high purity without employing $NH_3$ while simultaneously minimizing evaporative and purification costs. By proper choice of membranes and maintenance of acidic solutions on both sides of the weakly basic anion permselective membrane, the electrodialytic process of the present invention operates at high current efficiency and low unit cell potential and, thereby minimizes overall power consumption.

Set forth hereinbelow are the detailed experimental conditions and procedures used to operate the process of the instant invention to obtain high strength, high purity $Na_2CO_3$ and either HCl or $CaCl_2$ while maintaining high current efficiency and low unit cell potential.

BRIEF DESCRIPTION OF THE DRAWINGS

FIG. 1 is an illustration of a flow diagram of the process of the present invention wherein aqueous NaCl solutions are converted into $Na_2CO_3$ and HCl or $CaCl_2$ utilizing electrodialytic water-splitting and neutralization reactions.

DETAILED DESCRIPTION OF THE INVENTION

The present invention provides a process for the production of high strength, high purity $Na_2CO_3$ and either high purity HCl or $CaCl_2$ by the electrodialytic water-splitting of aqueous sodium chloride solutions to produce aqueous NaOH and HCl product streams, combined with chemical neutralization of at least the NaOH stream with a carbonating agent to produce a $Na_2CO_3$ stream, further combined with recycling at least a portion of the $Na_2CO_3$ stream to produce high strength $Na_2CO_3$. The electrodialysis is accomplished in a unit cell which is separated by membranes into three compartments which are, in order, acid, salt and base. The membranes are of three types and are arranged in each unit cell in the following order: bipolar, weakly basic anion permselective and strongly acidic cation permselective. Thus, the anion permselective membrane is bounded by the acid compartment on one face and by the salt compartment on the other face. It is a critical feature of the process of the present invention that the solutions on both sides of the weakly basic anion permselective membrane are maintained at a pH of less than about 7.

Thus, in accordance with the process of the present invention, aqueous NaCl solution streams, preferably saturated NaCl streams are supplied to salt compartments or zones of an electrodialysis cell and dilute HCl and concentrated (about 28 weight %) $Na_2CO_3$ streams are supplied to the acid and base compartments. When direct electric current is applied to electrodes, i.e., anode and cathode, positioned at opposite ends of the cell, water at the bipolar membrane is converted into hydrogen and hydroxyl ions; the hydrogen ions produced at the cation face of the membrane migrate into the acid compartment and the hydroxyl ions produced at the anion face migrate into the base compartment. Thus, there is produced an aqueous HCl-enriched stream in the acid compartment and an aqueous NaOH-enriched $Na_2CO_3$ stream in the base compartment. Chemical neutralization of at least the NaOH product in the $Na_2CO_3$ stream is effected with a carbonating agent such as an aqueous solution of $NaHCO_3$, $CO_2$ gas or mixtures thereof, preferably $CO_2$ gas, to produce high strength $Na_2CO_3$ streams.

Neutralization is conveniently accomplished external to the electrodialytic cell to allow production of a nearly saturated, i.e., between about 6 and 7 normal, preferably at least about 6.5 N $Na_2CO_3$ solution and at least a portion of the $Na_2CO_3$ stream is removed as product and the remainder is recycled to the base compartment of the cell to maintain therein a high $Na_2CO_3$ concentration and a low $OH^-$ concentration and thereby to control the $OH^-$ back migration into the salt zone.

At least a portion of the aqueous HCl-enriched stream is removed as product and the remainder is preferably recycled to the acid compartment of the cell to maintain ion-current flow therein and to allow the $H^+$ back migration into the salt zone to exceed the $OH^-$ back migration thereto. The HCl product stream can be neutralized with CaO, limestone, $CaCO_3$ or mixtures thereof, preferably with limestone, external to the acid compartment to produce a $CaCl_2$ stream, preferably a $CaCl_2$ stream and $CO_2$ gas. Alternatively, the HCl product stream can be transferred to another process, e.g., to acidify the brine employed in a chlor-alkali cell, preferably an electrolytic caustic/chlorine cell having a permselective membrane.

Thus, by feeding at least a portion of the HCl product stream to the acid zone and at least a portion of the $Na_2CO_3$ product stream to the base zone, the composition and concentration of the acid and base streams are controlled to cause the back migration of the $H^+$ into the salt zone to exceed the back migration thereto to all the alkaline species, e.g., $OH^-$ and $CO_3^=$ and thereby maintain the pH of the acid and salt streams on opposite faces of the weakly basic anion permeable membrane at a value less than about 7. In this way the process of the present invention operates to produce high strength, high purity $Na_2CO_3$ and high purity HCl or $CaCl_2$ while simultaneously maintaining high current efficiency and low unit cell potential.

Electrodialytic water-splitting of aqueous salts, e.g., NaCl to produce aqueous acid, e.g., HCl and aqueous base, e.g., NaOH is well known in the art. For example, U.S. Pat. No. 2,829,095 discloses an electrodialytic cell having weakly basic anion permselective and weakly acidic cation permselective membranes combined with a bipolar membrane; an alternative unit cell comprising strongly basic anion permselective, strongly acidic cation permselective and bipolar membranes is disclosed. In a specific embodiment of the present invention to produce high purity HCl and high strength, high purity $Na_2CO_3$, it was surprisingly discovered that by employing a unit cell having a bipolar, a weakly basic anion permselective and a strongly acidic cation permselective membrane, and by maintaining the pH of solutions on both sides of the weakly basic anion membrane at a value less than about 7, preferably between 3 and 7, and by recycling at least a portion of the $Na_2CO_3$ to the base compartment, high strength $Na_2CO_3$ having a concentration of between about 6 N and 7 N, preferably about 6.5 N was produced while simultaneously achieving a cumulative current efficiency of at least about 75%, preferably about 82% and a low unit cell potential drop of less than about 2.5 volts, preferably less than about 2.0 volts. By operating at high current efficiency and low unit cell potential, the overall electric power consumption is reduced. Thus, in accordance with this specific embodiment of the present invention high strength, high purity $Na_2CO_3$ having a concentration of about 6.5 N and a NaCl content of about 0.01 weight percent and, high purity HCl having a concentration of about 8 to 10 weight percent, preferably about 8.8 weight percent and an NaCl content of less than about 0.01 weight percent are produced while simultaneously consuming less power than previously thought possible. When a portion of the HCl product stream was removed and neutralized with CaO, CaCO$_3$, limestone or mixtures thereof, preferably limestone, there was produced a solution of CaCl$_2$, preferably CO$_2$ gas and a solution having a concentration of about 12.5 weight percent CaCl$_2$ and containing less than about 0.1 weight percent, preferably less than about 0.01 weight percent NaCl; the remainder of the HCl stream is recycled to the acid compartment. On the other hand, the concentration of CaCl$_2$ produced by the Solvay ammonia-soda process is slightly lower, e.g., about 11 weight percent and the NaCl content concentration typically higher, e.g., up to about 4.5 weight percent. Thus, another advantageous feature of the present invention is the lower evaporative and purification costs incurred to obtain more concentrated solutions of CaCl$_2$, hydrates thereof or anhydrous CaCl$_2$.

When more concentrated solutions of CaCl$_2$, i.e., in excess of about 12-13 weight percent are desired, a solution of CaCl$_2$ having a pH of about 5 is fed to the acid compartment. A product solution containing about 26 weight percent CaCl$_2$ and about 4 weight percent HCl is withdrawn from the cell and, neutralized as described hereinabove to produce concentrated CaCl$_2$ solutions. A portion of this concentrated solution is withdrawn as product; the remainder is diluted with water at pH 5 and recycled to the acid compartment. Surprisingly, it was discovered that by recycling this acidic CaCl$_2$ solution, more concentrated solutions, up to about 31 weight percent, preferably at least about 30 weight percent CaCl$_2$ solutions are produced at higher current efficiency as compared to the process of the present invention which operates without recycling the CaCl$_2$. Additionally, these higher strength CaCl$_2$ solutions have a low NaCl content which is less than about 0.5 preferably less than about 0.1 weight percent. The unit cell potential drop is below 3.2 volts preferably below 3.0 volts; the pH of the solutions on both sides of the anion permeable membrane is maintained at a value below about 3, preferably below about 1. In addition, to remove substances, e.g., CaCO$_3$, CaSO$_4$, etc. which may clog or foul the membranes, it has been found convenient to wash the membranes periodically with dilute, (10 weight percent) HCl to maintain the unit cell potential drop at a value less than 3.2 volts preferably below about 3.0 volts. In this preferred embodiment, the choice of the kind of anion permeable membrane is not as critical; either weakly or strongly basic anion permeable membranes can be conveniently employed.

Electrolysis is not as efficient as water-splitting for the process of the present invention. The main difference between electrolysis of aqueous NaCl to produce HCl and NaOH and electrodialytic water-splitting by bipolar membranes in accordance with the process of the present invention to carry out the same process is that electrolysis generates H$^+$ and OH$^-$ ions at the electrodes only and at the same time generates explosive gaseous oxidation-reduction products, H$_2$, O$_2$ and Cl$_2$. For electrolysis, each equivalent of H$^+$ and OH$^-$ ions generated will result in an equivalent amount of electrode gases, e.g., Cl$_2$, O$_2$ and H$_2$ being produced.

Electrodialytic water-splitting, on the other hand requires only two electrodes for generation of H$^+$ and OH$^-$ ions at each end of the several bipolar membranes. Therefore, in water-splitting, toxic, explosive gaseous oxidation-reduction products are formed in only small amounts relative to the total amount of H$^+$ and OH$^-$ formed at the bipolar membranes. In general, the process of electrolysis requires more energy than does water-splitting since the energy required to produce H$_2$, Cl$_2$ and O$_2$ from salt water in electrolysis must be supplied in addition to the energy needed to produce H$^+$ and OH$^-$ from water.

A preferred embodiment of the process of the present invention utilizes concentrated aqueous sodium chloride solutions, preferably saturated aqueous sodium chloride as feeds in an electrodialytic water-splitter and external neutralization of the products therefrom with CaCO$_3$ and CO$_2$ to produce high strength, high purity products, i.e., Na$_2$CO$_3$ and CaCl$_2$, having substantially higher purity, i.e., lower NaCl content, then produced by the prior art Solvay ammonia-soda or electrolytic processes.

In the process of the present invention, unlike the Solvay process, NH$_3$ is not employed; CaCO$_3$ is used directly, i.e., no calcination is required.

By the term "current efficiency" as used herein, we mean the proportion of the applied current that is effective in carrying out the desired electrodialytic processes of the present invention. Thus, in accordance with the process of the present invention, under the influence of direct current, water at a bipolar membrane is split into hydrogen ions and hydroxyl ions, which are produced at the cation and anion-permselective faces of the bipolar membrane and migrate into acid and base compartments, respectively. The chloride anions migrate from the salt compartment through the weakly basic anion permselective membrane into the acid compartment thereby forming HCl; the sodium ions migrate through the strongly acidic cation-permselective membrane into the base compartment thereby forming NaOH. It is well known in the prior art that the current efficiency for an electrodialytic conversion of an aqueous salt into the corresponding acid and hydroxide base decreases as the concentration of all ionic species increases. It is observed in the development of the process of the present invention that at high ionic concentrations, i.e., above about 1 mol/liter of cation or anion, the ion-selectivities of all mono- and bipolar permselective membranes in an electrodialysis cell are lower. Substantial amounts of anions, e.g., Cl$^-$ ions migrate from the salt compartments through the acid compartment and bipolar membranes into the base compartments and substantial amounts of cations, e.g., Na$^+$ ions, migrate from the salt compartments through the base compartments and bipolar membranes into the acid compartments thereby lowering the current efficiency and producing impure products.

However, it has been found in accordance with the process of the present invention that by controlling composition and concentration of the acid and base streams and further by maintaining the solutions on both sides of the weakly basic anion permselective membrane acidic as described hereinabove high strength products substantially free of contaminants were produced. The H$^+$ and OH$^-$ ions due to their smaller size, however, back-migrate through the anion and cation-permselective membranes into the salt compartments; the small H$^+$ ions back-migrate to a greater extent of OH$^-$ ions when measured at equal concentrations of H$^+$ and OH$^-$.

It was discovered that by feeding Na$_2$CO$_3$ streams substantially free of OH$^-$ ion to the base zones and feeding dilute HCl streams having a concentration of about 0.5 N, preferably 0.5 N HCl to the acid zones, the back migration of the H+ ions is greater than the back migration of all alkaline species, e.g., OH− and $CO_3^=$; the pH of the acid and salt solutions on both faces of the weakly basic anion permselective membrane are thereby maintained at a value less than about 7, preferably between 3 and 7. When concentrated $CaCl_2$ streams having a pH of about 5 are fed to the acid zone and the base feed remains the same, the pH of the acid and salt solutions on both sides of the anion membrane are maintained at a value less than about 3, preferably less than about 1.

The application of electrodialytic water-splitting to produce acid and alkaline solutions is well known. However, it was discovered that by maintenance of acidic solutions on both faces of specifically selected membranes high strength, high purity $Na_2CO_3$ and either high purity HCl or $CaCl_2$ products are obtained while simultaneously maintaining high current efficiency and low unit cell potential. When high strength, high purity HCl and $Na_2CO_3$ are the desired products, weakly basic permselective membranes are positioned between bipolar and strongly acidic cation permselective membranes. By maintaining the pH of the solutions on both faces of the weakly basic anion permselective membrane at a value less than about 7, preferably between about 3 and 7, this anion membrane is more conductive and more permselective even at high ion concentration i.e., e.g., about 2-3 N HCl and saturated NaCl; cations like Na+ are almost totally excluded. When high strength, high purity $CaCl_2$ and $Na_2CO_3$ are the desired products, strongly basic anion permselective membranes are conveniently employed in place of the weakly basic anion membrane and both the $CaCl_2$ and $Na_2CO_3$ streams are recycled. By maintenance of the pH of the $CaCl_2$ and NaCl streams at a value less than about 3, preferably less than about 1, high current efficiency and high permselectivity are achieved while simultaneously preventing the precipitation of calcium compounds, e.g., $Ca(OH)_2$ and $CaCO_3$. By allowing H+ ion back-migration to predominate over the back migration of all alkaline species, the overall current efficiency for the process of this invention is determined by the extent of H+ ion back-migration. Of course, the H+ ion back-migration increases and the overall current efficiency decreases as the concentration of HCl in the acid compartment increases.

Thus, by proper application of a weakly basic anion permselective membrane between acid and salt stream as described above, a current efficiency of 81.5% and a unit cell potential drop of 1.9 volts were achieved for the production of 8.8 weight percent HCl (a 12.5 weight percent solution of $CaCl_2$ is obtained when this HCl stream is neutralized with limestone external to cell) and 28 weight percent $Na_2CO_3$. This corresponds to an electric power consumption of 1070 Kwhr/NT $Na_2CO_3$. No membrane fouling was observed when the saturated NaCl stream was maintained at a pH of less than 3.

In an alternate embodiment of the process of the present invention, the HCl product is neutralized, external to the cell, by CaO, $CaCO_3$ or limestone, or mixtures thereof preferably limestone, and the $CaCl_2$ product solution is recycled to the acid compartment. Recycling of the $CaCl_2$ allowed production of more concentrated solutions i.e., up to about 30 weight percent at higher current efficiency than operation of the process without $CaCl_2$ recycle. The recycling of the $Na_2CO_3$ solution to the base compartment is continued to obtain the nearly saturated $Na_2CO_3$ solution, after carbonation of the NaOH. By recycling acidic $CaCl_2$ to the acid compartment, the low H+ concentration maintained therein improves the overall current efficiency relative to the operation of the process of the present invention without $CaCl_2$ recycle. The unit cell potential observed using $CaCl_2$ recycle is about 0.5 to 1.0 volt higher than that observed in the absence of $CaCl_2$. For proper operation of the process of the present invention, the pH of the brine with $CaCl_2$ recycle should be maintained at a value less than about 1. In addition, periodic washing of all membranes with dilute aqueous acid, e.g., 10% HCl at intervals of 80 to 100 hrs. is desirable to maintain the unit cell potential at a desirable level.

The process may be better understood by reference to the accompanying drawing. In FIG. 1, an aqueous solution of sodium chloride, preferably saturated sodium chloride or brine, enters the salt compartment 6 in electrodialytic water-splitter 5 from line 2 through valve 3 and line 4. Before entry to the water-splitter, the brine may be purified by any convenient chemical and/or physical treatment to remove impurities which may clog, destroy or, coat the membranes or react with the acid or base streams. Usually the saturated NaCl or brine stream was purified by treatment with $Na_2 CO_3$ and caustic, subsequently filtered to remove $Ca^{++}$ as $CaCO_3$ and then circulated to the salt zone 6. The electrodialytic water splitter incorporates a plurality of repeating unit cells between two electrodes. In general, each repeating unit cell comprises, in order, a bipolar permselective membrane 10, a weakly basic anion permselective membrane 12 and a strongly acidic cation permselective membrane 14 and another bipolar permselective membrane 16 dividing the unit cell into an acid compartment 26, a salt compartment 6 and a base compartment 64. The anion face of bipolar membrane 16 forms one side of the base compartment 64 and faces the positive electrode 18; one face of cation permselective membrane 14 forms the other side of compartment 64. The cation face of bipolar membrane 10 forms one side of the acid compartment 26 and faces the negative electrode 20; one face of anion-permselective membrane 12 forms the other side. The salt compartment 6 is formed between the other faces of anion membrane 12 and cation membrane 14. The electrodes can be of any convenient composition or design found useful in electrodialytic water-splitting, e.g., platinum, iron, etc; supporting electrolytes for the electrodes found useful in the process of the instant invention are sulfates of sodium, potassium, ammonium or mixtures thereof. Porous dividers, e.g., semipermeable or ion-permselective membranes can be positioned between the electrodialytic water-splitter and electrodes thereby forming electrode compartments (not shown). In this way, any reactions which corrode, clog or destroy the membranes or electrodes are avoided.

Bipolar membranes are comprised of an anion permselective face and cation permselective face. Among the bipolar membranes found useful in the process of the present invention are the sandwich (with and without resistance lowering electrolyte layers), single film and cast bipolar membranes, preferably the single film bipolar as disclosed in U.S. Pat. No. 4,024,043 and more preferably the cast bipolar membrane as disclosed in U.S. Pat. No. 4,115,889, which is hereby incorporated by reference. Unexpectedly, when the process of the present invention is operated using cast bipolar membranes, the unit cell potentials are much lower and the current efficiency slightly higher than when single film bipolar membranes are employed. The process of the present invention is not limited to the use of any specific type of bipolar membrane; any bipolar membrane of high ion-selectivity and low resistance can be utilized.

The anion-permselective membranes found useful in the process of the instant invention have the following characteristics: (1) high permselectivity for ordinary anions and univalent anions; (2) low resistance at high current density and high ionic-strength; (3) reasonable durability and mechanical strength; (4) high current efficiency for concentrating acid, i.e., highly resistant to $H^+$ back migration; and, (5) weakly or strongly basic groups bonded to a polymeric matrix. These anionic permselective membranes are well known in the art and are commercially available from Asahi Glass Co., Tokyama Soda and Ionics, Inc.

When only the HCl stream is circulated in the acid compartment, a weakly basic anion permselective membrane is employed and the pH of the solutions on both faces of this membrane is maintained at a value less than about 7, preferably between 3 and 7. By maintaining such acidic solutions on both faces of the weakly basic anion permselective membrane, it was discovered that the resistance of this membrane is lower, and that the current efficiency for producing acid and the anion-permselectivity is higher. Although U.S. Pat. No. 2,829,095 discloses that the weakly basic anion membrane is more permselective when bounded by acidic solutions and the weakly acidic cation membrane is more permselective when bounded by basic solutions, the proper utilization of the weakly basic anion permselective membrane and its cooperation with a strongly acidic cation membrane in accordance with the process of the present invention to provide high current efficiency low membrane resistance and low unit cell potential drop is not taught.

When the $CaCl_2$ stream is recycled to the acid compartment, a strongly basic or weakly basic anion permselective membrane, preferably strongly basic is positioned between the acid and salt streams. By maintaining the of the solutions on both faces of the anion permselective membrane at a value less than about 3, preferably less than about 1, the current efficiency for the production of high strength $CaCl_2$ is high, e.g., at least about 65%, and preferably at least about 72%. The unit cell potential drop is less than about 3.5 volts, preferably less than about 3.0 volts and membrane fouling as by $CaCO_3$, $(Ca(OH)_2$ etc. is less. In addition, by maintaining the pH of both the acid and salt compartment less than about 3, preferably below about 1, the precipitation of $Ca(OH)_2$, $CaSO_4$ or $CaCO_3$ was reduced.

The cation permselective membranes found useful in the process of this invention have the following characteristics: (1) high permselectivity for hydrogen ions and ordinary cations; (2) low resistance at high current density and high ionic strength; (3) reasonable durability and mechanical strength; (4) high current efficiency for concentration of $OH^-$ in a solution containing $CO_3^=$, i.e., highly resistant to $OH^-$ and $CO_3^=$ back migration and a low resistance to $Na^+$ transfer; and, (5) strongly acidic groups bonded to a polymeric matrix. Such membranes are commercially available from the manufacturers which supply the anion selective membranes described above. In addition, these univalent selective cation membranes should preferably be selective for univalent cations and reject $Ca^{++}$ ion and thereby prevent $CaCO_3$ precipitation on base side of such membranes when the $CaCl_2$ recycle modification of the process is employed.

When direct current is supplied to the electrodes 18 and 20 of the three compartment water-splitter shown in FIG. I, water is effectively converted at the bipolar membrane into hydrogen ions and hydroxyl ions. The hydrogen ions move toward the cathode 20 through the cation-permeable side of a bipolar membrane into acid compartment 26. The hydroxyl ions move toward the anode 18 through the anion permeable side of a bipolar membrane into base compartment 64. Adjacent to the cation-permeable face of bipolar membrane 10 is an anion permeable membrane 12, thereby forming acid compartment 26. Adjacent to the anion-permeable face of bipolar membrane 16 is a cation-permeable membrane 14, thereby forming base compartment 64. The water-splitting process is accompanied by the migration of $Cl^-$ ion and $Na^+$ ions from the sodium chloride solution contained in the salt compartment 6 formed by the anion-permeable membrane 12 and cation-permeable membrane 14 to acid compartment 26 and base compartment 64, respectively. Thus, HCl is produced in acid compartment 26 and NaOH is produced in base compartment 64. The electrodialytic water-splitting apparatus consists of end-plates, gaskets, feed entry ports, parts, and membranes. The end-plates, to which inert electrodes are mounted, have channels providing flow to the cell and serve to clamp other components of the unit into place upon assembly. The gaskets made of soft, inert polymeric material from the solution chambers of the unit and are of such configuration that holes and channels through them form manifolds for the distribution of the three solutions: acid, base and salt, to the appropriate compartments. The spacers, typically polypropylene mesh, serve to keep the membranes from touching. The entry ports fit into slots in the gaskets and help distribute the flow of solution in each compartment and provide a tight seal between adjacent compartments. In addition to the electrodialytic water-splitting unit, conventional pumps, reservoirs and a direct-current source are required to perform the water-splitting operation.

Referring again to the drawing, the depleted salt solution is removed from salt compartment 6 through line 7. The HCl product is removed from acid compartment 26 via line 27.

When a pure HCl product is desired, the product stream from line 27 is moved through valves 29 and 31 in line 30 to line 32. At least a portion of the HCl product may be removed through valve 33 to line 34 and the remainder passed through line 50, filter 51 line 22 to valve 23 and line 25 into acid compartment 26. The filter 51 is of conventional design. Water is added to the acid stream via line 24 and valve 23 to adjust the concentration thereof.

When calcium chloride is the desired product, neutralization of the product HCl stream is conveniently accomplished external to the cell. At least a portion of the acid product stream in line 27 is passed into the HCl neutralizer 42 through line 40 and valve 29. Calcium oxide, calcium carbonate, limestone or mixtures thereof, preferably limestone, is added to the neutralizer 42 via line 41. It was found convenient that by milling limestone to less than about 34 mesh, essentially complete conversion of HCl to $CaCl_2$ and $CO_2$ gas was achieved with an amount of limestone only slightly in excess of the stoichiometric amount, in a reaction time of about 10 minutes. The $CO_2$ gas from the neutralization reaction, removed from the reactor 42 via vent 43 may be transferred to reactor 68 for the carbonation of NaOH from base compartment 64, or utilized in another process, or alternatively, vented. The $CaCl_2$ product solution is removed from neutralizer 42 via line 41 to clarifier 46 wherein the neutralizer and clarifier are of any conventional design. The calcium chloride solution from the clarifier may be transferred via line 47 to purge or an evaporator to produce a more concentrated solution, hydrated $CaCl_2$ or the anhydrous solid. When $CaCl_2$ recycle is desired, the $CaCl_2$ product stream from clarifier 46 may be returned via lines 48 and 32, valves 31 and 33 through line 50 filter 51 to the acid compartment 26. The concentration of the $CaCl_2$ may be adjusted by the addition of water into the return stream via line 24. HCl may be added to the $CaCl_2$ solution via valve 31.

Recycle of $CaCl_2$ to the acid compartment eventually results in the precipitation of calcium salts in all compartments thereby increasing the unit cell potential. Periodic washing of all membranes with 10 weight % HCl at intervals of 80 to 100 hours lowers the unit cell potential to almost its initial value.

Sodium hydroxide is produced by migration of $Na^+$ from the salt compartment 6 toward cathode 20 into the base compartment 64 wherein this excess sodium ion is captured by $OH^-$ produced at the anion face of bipolar membrane 16. In order to maintain the pH of the brine at a value less than about 7, aqueous sodium carbonate is introduced as a feed into base compartment 64 via line 62. The product NaOH in $Na_2CO_3$ solution is transferred from the base compartment via line 66 to carbonator 68 wherein the NaOH values are converted into $Na_2CO_3$ by contact therein with a carbonating agent, preferably $CO_2$ gas or an aqueous solution of $NaHCO_3$, more preferably $CO_2$ gas. The $CO_2$ gas may conveniently be $CO_2$ gas from the neutralizer 42 or flue gas, or mixtures thereof. The carbonator 68 may be of any conventional design equipped with gas inlets 65 and 67 and vent 69. After the conversion to $Na_2CO_3$ is completed, this solution of $Na_2CO_3$ is removed via line 70. A portion of the solution is transferred to monohydrate crystallizer 80 via line 72 and valve 71. The mother liquors are purged from 80 via line 82 and the monohydrate crystals converted to light or dense ash by conventional techniques.

The remainder of the $Na_2CO_3$ solution is recycled to the base compartment 64 via lines 74, 60 and 62, valves 71 and 63 and filter 76. Water, as needed, can be added to the $Na_2CO_3$ solution via line 61 and valve 63.

To minimize evaporation costs, it is desirable to produce nearly saturated solutions of $Na_2CO_3$, i.e., about 30 weight % $Na_2CO_3$ in the carbonator 68. To prevent precipitation of crystalline $Na_2CO_3$, the temperature of the $Na_2CO_3$ solution is conveniently maintained between abut 30° and 40° C.

The invention will be further illustrated by reference to the following examples, the details of which should not be construed as limiting the invention except as may be required by the appended claims.

EXAMPLE 1

In this run high purity $CaCl_2$ and $Na_2CO_3$ were produced using electrodialysis apparatus consisting of a platinum anode, a CMV* cation membrane; a second CMV cation membrane; two unit cells having, in order a cast bipolar membrane+ with the highly dissociable anion permeable side facing the anode, an AAV* anion exchange membrane and a CMV cation exchange membrane; another CMV cation exchange membrane; and a platinum cathode. Neoprene ® sheets cutout to form compartments were placed between adjacent membranes. In addition, Verar ® screens were positioned to facilitate flow distribution in the compartments and to maintain separation between the membranes. Polypropylene end blocks having electrode compartments were used to compress and seal the membrane stack. These blocks contained ports for pumping input and output feeds to the 1.6 mm thick solution compartments formed by the sheets, screens and membranes. A cell with nine compartments was thereby formed, the compartments being anolyte, salt, base, acid, salt, base, acid, salt, and catholyte. The solutions were pumped from reservoirs and through the cell; the fluid velocity in each compartment was maintained at about 15 cm/sec by the circulation pumps. The anolyte and catholyte were supplied 2 N sodium sulfate rinse from a common reservoir wherein the pH was maintained at about 6.0 by the controlled addition of 2 N $H_2SO_4$.

+ prepared by procedure in U.S. Pat. No. 4,116,889
* available commercially from Ashai Glass Co.

The salt feed stream (saturated reagent grade NaCl) was circulated to the salt compartments in the cell stack from a calibrated reservoir and controlled with throttling valves, pressure gauges, and a rotometer. The brine pH was maintained at 2.0.

The acid compartment was charged with 0.5 N HCl. The base compartment was charged with pure $Na_2CO_3$ having a concentration of 5.0 N $Na_2CO_3$ (21.75 weight %). Heating of the solution in the base compartment was not required because the temperature of all the solutions remained at 32° to 34° C. upon the application of DC power to the electrodes.

DC power was supplied to the electrodialysis cell at a current density of 100 amps/ft$^2$ or 1.4 amps/cm$^2$, by a Hewlett-Packard Model 6296A power supply operated in the constant current, variable voltage mode. After the passage of current for 7 hours, the concentration of the product acid stream of 2.5 N (8.75 weight %) HCl and the product base stream had a composition of 2.25 N (7 weight %) NaOH in 4.66 N (19.5 weight %) $Na_2CO_3$. a major portion (80% by volume) of the 2.5 N HCl product stream was neutralized with finely ground (35 mesh) limestone in a unit external to the stack to provide a 12.5 weight % $CaCl_2$ having a NaCl content of 1200 ppm (0.12 weight %). The remainder (20% by volume) of the 2.5 N HCl product stream was diluted to 0.5 N HCl with $H_2O$ and returned to the acid compartment.

The product base stream was contacted with $CO_2$ gas from a pressure tank to provide a 6.74 N (27.5 weight %) $Na_2CO_3$. A portion (19% by volume) of this product was withdrawn and evaporated to produce $Na_2CO_3.H_2O$ which was dried to provide soda ash. The remainder (71% by volume) of the 27.5 weight % $Na_2CO_3$ solution was filtered, diluted with water to about 22 weight % and recycled to the base compartment. The overall current efficiency was 81%, the average unit cell potential was 1.92 volts of steady state. No membrane fouling was observed after 200 hours when reagent grade NaCl was used as feed.

From the current efficiencies, 0.009 equivalents of NaCl were present in each equivalent of HCl produced and 0.008 equivalents of NaCl were present in each equivalent of NaOH produced. Thus, the HCl product stream contained 0.14 weight % NaCl; the NaOH product stream contained 0.12% by weight of NaCl.

EXAMPLE 2

In this run $CaCl_2$ and $Na_2CO_3$ were produced at high concentration, i.e., about 30 weight %, by feeding concentrated solutions of these salts into the acid and base compartments in the apparatus of Example 1, modified in the following way. The bipolar membrane was a single film bipolar membrane prepared by the method disclosed in U.S. Pat. No. 4,024,043; the strongly acidic cation membranes, e.g., Nafion-125, commercially available from Du Pont were employed and strongly basic anion membranes, e.g., the AVS-4T anion membranes available from Tokyama Soda were employed. The pH of the purified brine was maintained at 1.0. The initial concentration of the $CaCl_2$ was 3.5 M; that of the base, 6.2 N $Na_2CO_3$. After the direct current was applied, the product base stream had a concentration of 4 weight % (1.24 N) NaOH in 25 weight % (6.0 N) $Na_2CO_3$ and the product acid stream contained 2 weight % (0.83 N) HCl in 28 weight % $CaCl_2$. These product streams were neutralized and treated by the methods described in Example 1.

The overall current efficiency was 67.6%; the average unit cell potential was 3.32 volts at steady state. This unit cell potential was maintained by periodic washing of all membranes with 10 weight % HCl at intervals of 60 to 100 hours.

From the current efficiencies, 0.001 equivalents of NaCl were present in each equivalent of HCl produced and 0.067 equivalents of NaCl were present in each equivalent of NaOH produced. Thus, the HCl product stream contained 0.005 weight % NaCl; the NaOH product stream contained 0.5 weight % of NaCl.

We claim:

1. A process for the electrodialysis of aqueous NaCl in an electrodialytic cell having anode and cathode compartments separated by acid, salt and base zones respectively which comprises the steps of:
   (a) feeding an aqueous HCl stream to said acid zone of said electrodialytic cell located between the cation face of a bipolar membrane and one side of a weakly basic anion permselective membrane;
   (b) feeding an aqueous NaCl stream to said salt zone located between the other face of said weakly basic anion membrane and one face of a strongly acidic cation permselective membrane;
   (c) feeding an aqueous $Na_2CO_3$ stream to said base zone located between the other face of said cation permselective membrane and the anion face of a bipolar membrane;
   (d) passing a direct electric current through said electrodialytic cell, thereby effecting an increase in $H^+$ concentration in said HCl stream, an increase in $OH^-$ concentration in said $Na_2CO_3$ stream, the transfer of $Cl^-$ from said NaCl stream to the acid-enriched HCl stream and the transfer of $Na^+$ from said NaCl stream to the $OH^-$-enriched $Na_2CO_3$ stream;
   (e) maintaining a pH of streams on both faces of said anion permselective membrane at a value less than about 7;
   (f) withdrawing a portion of the partially depleted NaCl stream from said salt zone;
   (g) withdrawing the HCl-enriched stream from said acid zone;
   (h) withdrawing NaOH-enriched $Na_2CO_3$ stream from said base zone;
   (i) contacting said NaOH-enriched $Na_2CO_3$ stream from step (h) with a carbonating agent thereby forming additional $Na_2CO_3$; and
   (j) withdrawing at least a portion of said $Na_2CO_3$ stream as product.

2. A process as described in claim 1 wherein at least a portion of said HCl-enriched product stream withdrawn is recycled to the acid zone.

3. A process as described in claim 1 wherein at least a portion of said HCl-enriched product stream is contacted with calcium oxide, limestone, calcium carbonate or mixtures thereof.

4. A process as described in claim 3 wherein said HCl-enriched product stream is contacted with limestone, thereby forming $CaCl_2$ and $CO_2$ gas.

5. A process as described in claim 4 wherein at least a portion of said $CaCl_2$ is recycled to said acid zone.

6. A process as described in claim 1 wherein in step (i) said carbonating agent is $CO_2$ gas, an aqueous solution of $NaHCO_3$ or mixtures thereof.

7. A process as described in claim 1 wherein in step (i) said carbonating agent is $CO_2$ gas.

8. A process as described in claim 4 wherein said $CO_2$ gas is contacted with said NaOH-enriched $Na_2CO_3$ stream, thereby forming additional $Na_2CO_3$.

9. A process as described in claim 1 wherein the remainder of said $Na_2CO_3$ stream is recycled to said base zone.

10. A process as described in claim 1 wherein said pH of said NaCl steam in said salt zone is maintained at a value less than about 3.

11. A process as described in claim 1 wherein said pH of said NaCl stream in said salt zone is maintained at a value less than about 1.

* * * * *